United States Patent
Siedow

(10) Patent No.: US 10,628,637 B2
(45) Date of Patent: Apr. 21, 2020

(54) ENCLOSURE FOR CARD READER EQUIPPED DEVICE

(71) Applicant: BANK OF AMERICA CORPORATION, Charlotte, NC (US)

(72) Inventor: Mary Ann Siedow, Jacksonville, FL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 15/890,812

(22) Filed: Feb. 7, 2018

(65) Prior Publication Data

US 2019/0220630 A1    Jul. 18, 2019

Related U.S. Application Data

(60) Provisional application No. 62/617,861, filed on Jan. 16, 2018.

(51) Int. Cl.
| | | |
|---|---|---|
| *G06K 19/00* | (2006.01) | |
| *G06K 7/00* | (2006.01) | |
| *G06K 7/10* | (2006.01) | |
| *G06K 7/08* | (2006.01) | |
| *G06F 1/00* | (2006.01) | |
| *H04M 1/18* | (2006.01) | |

(52) U.S. Cl.
CPC ............ *G06K 7/0056* (2013.01); *G06F 1/00* (2013.01); *G06K 7/087* (2013.01); *G06K 7/10297* (2013.01); *H04M 1/185* (2013.01)

(58) Field of Classification Search
USPC ................. 235/435, 439, 441–443, 487, 492
See application file for complete search history.

(56) References Cited

U.S. PATENT DOCUMENTS

| | | |
|---|---|---|
| 1,347,839 A | 7/1920 | Coons et al. |
| 1,659,395 A | 2/1928 | Douglas et al. |
| 4,544,123 A | 10/1985 | Peacock |
| 5,029,784 A | 7/1991 | Blahout |
| 5,377,794 A | 1/1995 | Book |
| 5,439,101 A | 8/1995 | Brink et al. |
| 5,445,251 A | 8/1995 | Redwood |
| 5,607,054 A | 3/1997 | Hollingsworth |
| 5,717,566 A | 2/1998 | Tao |
| 5,877,896 A | 3/1999 | Gremban |
| 5,887,723 A | 3/1999 | Myles et al. |
| 5,988,823 A | 11/1999 | Wong |
| 5,996,778 A | 12/1999 | Shih |

(Continued)

*Primary Examiner* — Matthew Mikels
(74) *Attorney, Agent, or Firm* — Michael A. Springs; Moore & Van Allen PLLC; Jeffrey R. Gray

(57) ABSTRACT

An enclosure for an electronic device that includes a connection port aperture located in at least one edge, a rear face, and/or a front face of the enclosure. As will be described herein the connection port aperture may be sized to prevent interference with electronic device accessories, and more particularly card readers, which are operatively coupled to the electronic device through a connection port in the electronic device. As such, the connector port aperture allows for the secure connection between the accessory and the electronic device without the enclosure interfering with the accessory, which reduces the strain and vibration associated with use of the accessory, and in particular, with the use of cards with card reader type accessories.

18 Claims, 6 Drawing Sheets

(56) References Cited

U.S. PATENT DOCUMENTS

| | | | |
|---|---|---|---|
| 6,024,508 A | 2/2000 | Lippeth et al. |
| 6,039,419 A | 3/2000 | Brown et al. |
| 6,305,652 B1 | 10/2001 | Borke et al. |
| 6,547,283 B1 | 4/2003 | Moor |
| 6,763,942 B1 | 7/2004 | Yeh |
| 6,829,140 B2 | 12/2004 | Shimano et al. |
| 7,178,778 B2 | 2/2007 | Lee |
| 7,281,877 B1 | 10/2007 | Lederer et al. |
| 7,318,521 B2 | 1/2008 | Lau |
| 7,545,634 B2 | 6/2009 | Simonian et al. |
| D600,699 S | 9/2009 | Johnston et al. |
| 7,643,274 B2 | 1/2010 | Bekele |
| 7,735,644 B2 | 6/2010 | Sirichai et al. |
| 8,230,992 B2 | 7/2012 | Law et al. |
| D670,702 S | 11/2012 | Zhang et al. |
| 8,328,008 B2 | 12/2012 | Diebel et al. |
| D675,210 S | 1/2013 | Kim |
| D679,714 S | 4/2013 | Smith et al. |
| D685,799 S | 7/2013 | Canizares et al. |
| D685,800 S | 7/2013 | Canizares et al. |
| D685,801 S | 7/2013 | Canizares et al. |
| D685,802 S | 7/2013 | Canizares et al. |
| D689,056 S | 9/2013 | Li |
| D690,703 S | 10/2013 | Welch et al. |
| 8,607,976 B2 | 12/2013 | Wu et al. |
| 8,746,449 B2 | 6/2014 | Gallagher et al. |
| D708,621 S | 7/2014 | Gifford et al. |
| 8,807,333 B1 | 8/2014 | Cooper et al. |
| 8,925,722 B2 | 1/2015 | Poon et al. |
| D729,252 S | 5/2015 | Smith et al. |
| 9,219,516 B2 | 12/2015 | Haymond |
| D750,084 S | 2/2016 | Nguyen et al. |
| 9,259,076 B2 | 2/2016 | Gayler |
| D757,731 S | 5/2016 | Nguyen et al. |
| 9,362,968 B1 | 6/2016 | Haymond |
| 9,380,378 B2 | 6/2016 | Su et al. |
| 9,419,670 B2 | 8/2016 | Fathollahi |
| D766,247 S | 9/2016 | Burmester |
| D775,132 S | 12/2016 | Smith et al. |
| D776,122 S | 1/2017 | Akana et al. |
| D776,123 S | 1/2017 | Akana et al. |
| 9,580,209 B2 | 2/2017 | Blume et al. |
| D786,881 S | 5/2017 | Stewart et al. |
| D794,036 S | 8/2017 | Hennings et al. |
| D795,264 S | 8/2017 | Wright et al. |
| D795,880 S | 8/2017 | Akana et al. |
| D795,881 S | 8/2017 | Akana et al. |
| D798,302 S | 9/2017 | Burmester |
| D800,133 S | 10/2017 | Wright et al. |
| D804,486 S | 12/2017 | Nyholm et al. |
| D806,713 S | 1/2018 | Wright et al. |
| D818,525 S | 5/2018 | Burmester |
| D819,644 S | 6/2018 | Wright et al. |
| D824,392 S | 7/2018 | Charlesworth et al. |
| D824,394 S | 7/2018 | Charlesworth et al. |
| D824,395 S | 7/2018 | Charlesworth et al. |
| D824,396 S | 7/2018 | Charlesworth et al. |
| D824,397 S | 7/2018 | Charlesworth et al. |
| D824,933 S | 8/2018 | Harris et al. |
| D825,571 S | 8/2018 | Shannon, III |
| D830,368 S | 10/2018 | Zhang |
| D831,030 S | 10/2018 | Gao |
| D831,659 S | 10/2018 | Gao |
| 2002/0100398 A1 | 8/2002 | Santini |
| 2002/0162935 A1 | 11/2002 | Hardy |
| 2007/0172309 A1 | 7/2007 | Witter et al. |
| 2008/0142518 A1 | 6/2008 | Maistrellis |
| 2008/0237432 A1 | 10/2008 | Patterson |
| 2008/0302687 A1 | 12/2008 | Sirichai et al. |
| 2009/0159763 A1 | 6/2009 | Kim |
| 2009/0194209 A1 | 8/2009 | De Filippis et al. |
| 2010/0122924 A1 | 5/2010 | Andrews |
| 2010/0294909 A1 | 11/2010 | Hauser et al. |
| 2011/0031287 A1* | 2/2011 | Le Gette ............... F16M 11/04 224/101 |
| 2011/0297564 A1 | 12/2011 | Kim et al. |
| 2011/0297581 A1 | 12/2011 | Angel |
| 2012/0170212 A1 | 7/2012 | Gallouzi et al. |
| 2013/0213825 A1 | 8/2013 | Blume et al. |
| 2013/0222139 A1 | 8/2013 | Gouge et al. |
| 2014/0233167 A1* | 8/2014 | Rayner ................. H01H 13/06 361/679.3 |
| 2015/0292669 A1* | 10/2015 | Floersch ............... G06F 1/1626 248/553 |

* cited by examiner

ENCLOSURE FOR CARD READER EQUIPPED DEVICE

CLAIM OF PRIORITY UNDER 35 U.S.C § 119

This application claims priority to U.S. Provisional Patent Application Ser. No. 62/617,861, filed on Jan. 16, 2018 and entitled "ENCLOSURE FOR CARD READER EQUIPPED DEVICE", which is assigned to the assignees hereof and is hereby expressly incorporated by reference herein.

FIELD

The present invention relates generally to enclosures for electronic devices, and more particularly to enclosures that are configured for use along with other electronic device accessories.

BACKGROUND

Electronic devices are configured to work with various types of accessories. However, enclosures used to protect the electronic devices are often not configured to accommodate the accessories. There is a need for improved enclosures for electronic devices.

BRIEF SUMMARY

The following presents a simplified summary of one or more embodiments of the present invention, in order to provide a basic understanding of such embodiments. This summary is not an extensive overview of all contemplated embodiments, and is intended to neither identify key nor critical elements of all embodiments nor delineate the scope of any or all embodiments. Its sole purpose is to present some concepts of one or more embodiments of the present invention in a simplified form as a prelude to the more detailed description that is presented later.

The embodiments provided herein relate to an enclosure for an electronic device that includes a connection port aperture located in at least one edge, a rear face, and/or a front face of the enclosure. As will be described herein, the connection port aperture may be sized to prevent interference with electronic device accessories, and more particularly card readers, that are operatively coupled to the electronic device through a connection port in the electronic device. As such, the connector port aperture allows for the secure connection between the accessory and the electronic device without the enclosure interfering with the accessory, which reduces the strain and vibration associated with use of the accessory, and in particular, with the use of cards with card reader type accessories.

Embodiments of the invention comprise an enclosure for an electronic device. The enclosure comprises a front face comprising a display aperture, wherein the display aperture is configured to allow viewing of a display of the electronic device. The enclosure further comprises a rear face and one or more edges operatively coupling the front face to the rear face. The enclosure also comprises a connection port aperture in a portion of the front face, the rear face, or the one or more edges, wherein the connection port aperture is sized to extend around at least a portion of an accessory operatively coupled to the electronic device.

In further accord with embodiments of the invention, the connector port aperture is located within the one or more edges and extends into the front face and the rear face of the enclosure.

In other embodiments of the invention, the connector port aperture extends to the display aperture in the front face, such that the front face is discontinuous.

In still other embodiments of the invention, the connector port aperture is configured to prevent interference with the accessory.

In yet other embodiments of the invention, the connector port aperture has a width that ranges from 0.3 times to 0.7 times the width of the enclosure.

In further accord with embodiments of the invention, the connector port aperture has a width that ranges from 2.5 to 4.5 inches.

In other embodiments of the invention, the connector port aperture has a height that ranges from 0.5 to 2 inches.

In still other embodiments of the invention, the connector port aperture is configured to align with an electronic connection port of the electronic device.

In yet other embodiments of the invention, the one or more edges, the front face, or the rear face comprise an accessory securement element configured for securing at least a portion of the accessory when the accessory is operatively coupled to the electronic device and the electronic device is secured within the enclosure.

In further accord with embodiments of the invention, the accessory securement element comprises a pocket that creates an accessory space configured to receive at least a portion of the accessory, a strap that surrounds at least the portion of the accessory, or a flap that surrounds at least the portion of the accessory.

In other embodiments, the invention further comprises an attachment operatively coupled to the rear face, the one or more edges, or the front face.

In still other embodiments of the invention, the attachment is open in at least two orientations, wherein a first orientation is a landscape orientation and wherein a second orientation is a portrait orientation.

In yet other embodiments of the invention, the attachment has openings in at least a top side, a bottom side, a left side, and a right side, and wherein each opening may receive a hand.

In further accord with embodiments of the invention, the attachment has openings in at least each corner of the enclosure, and wherein each opening may receive a hand.

In other embodiments, the invention further comprises an assembly aperture in at least one edge of the one or more edges located between the front face and the rear face, and an assembly element operatively coupling the front face to the rear face at the assembly aperture. The assembly aperture and the assembly element allow for securing the electronic device within and removing the electronic device from the enclosure.

In still other embodiments of the invention, the assembly element comprises a flap that operatively couples a portion of the front face to a portion of the rear face.

In yet other embodiments of the invention, the front face comprises one or more swipe apertures, wherein the one or more swipe apertures are located at least partially within one or more of a top face portion, a bottom face portion, a left face portion, or a right face portion, and wherein the one or more swipe apertures allow a user to drag a finger from outside of a display of the electronic device into a display.

In further accord with embodiments of the invention, the top face portion comprises a top face swipe aperture, the left face portion comprises a left face swipe aperture, the right face portion comprises a right face swipe aperture, and wherein the connector port aperture serves as a bottom face swipe aperture.

To the accomplishment the foregoing and the related ends, the one or more embodiments comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
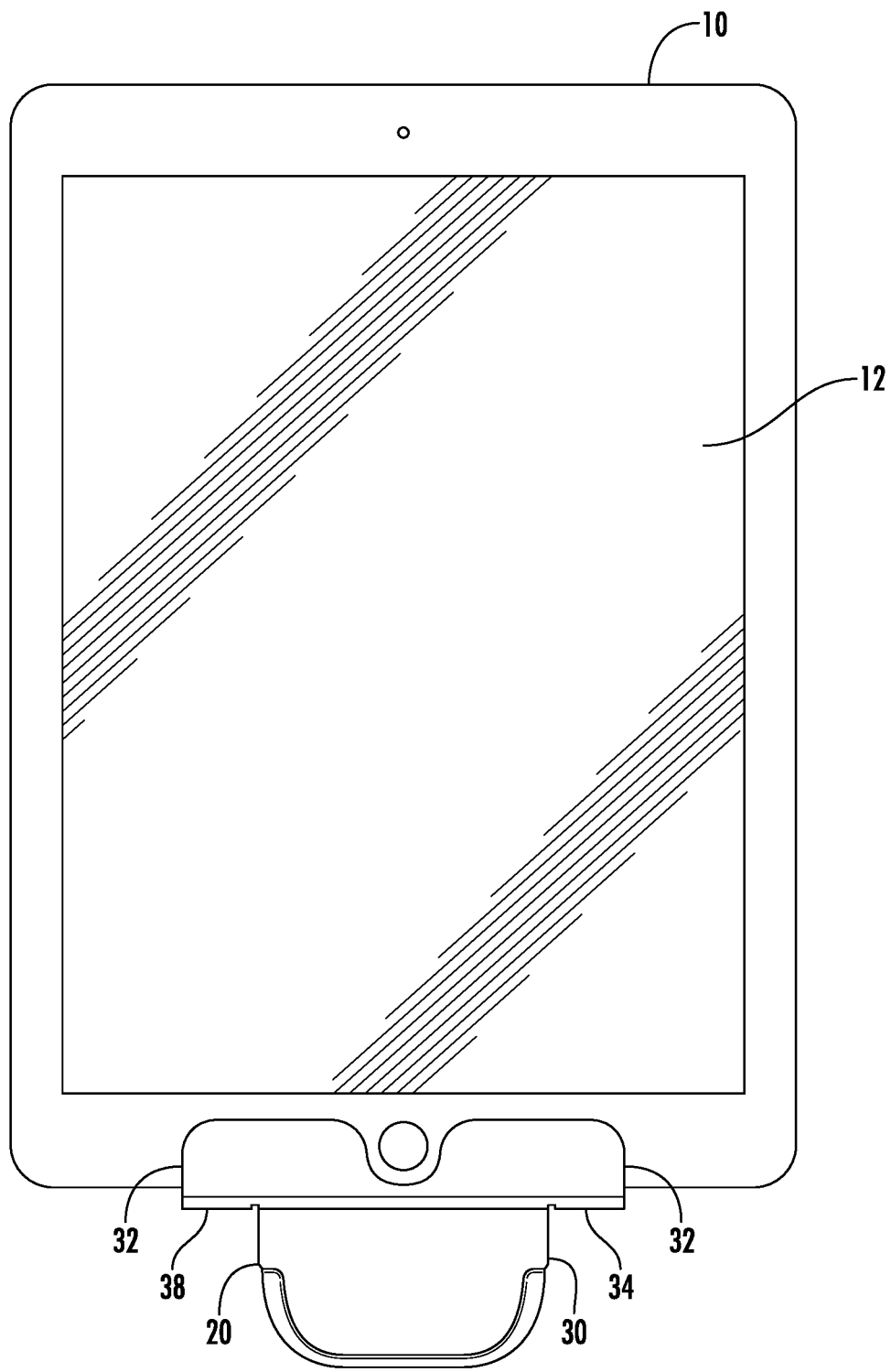
FIG. 1 is a front view of an electronic device with an accessory, in accordance with embodiments of the invention.
Figure 2:
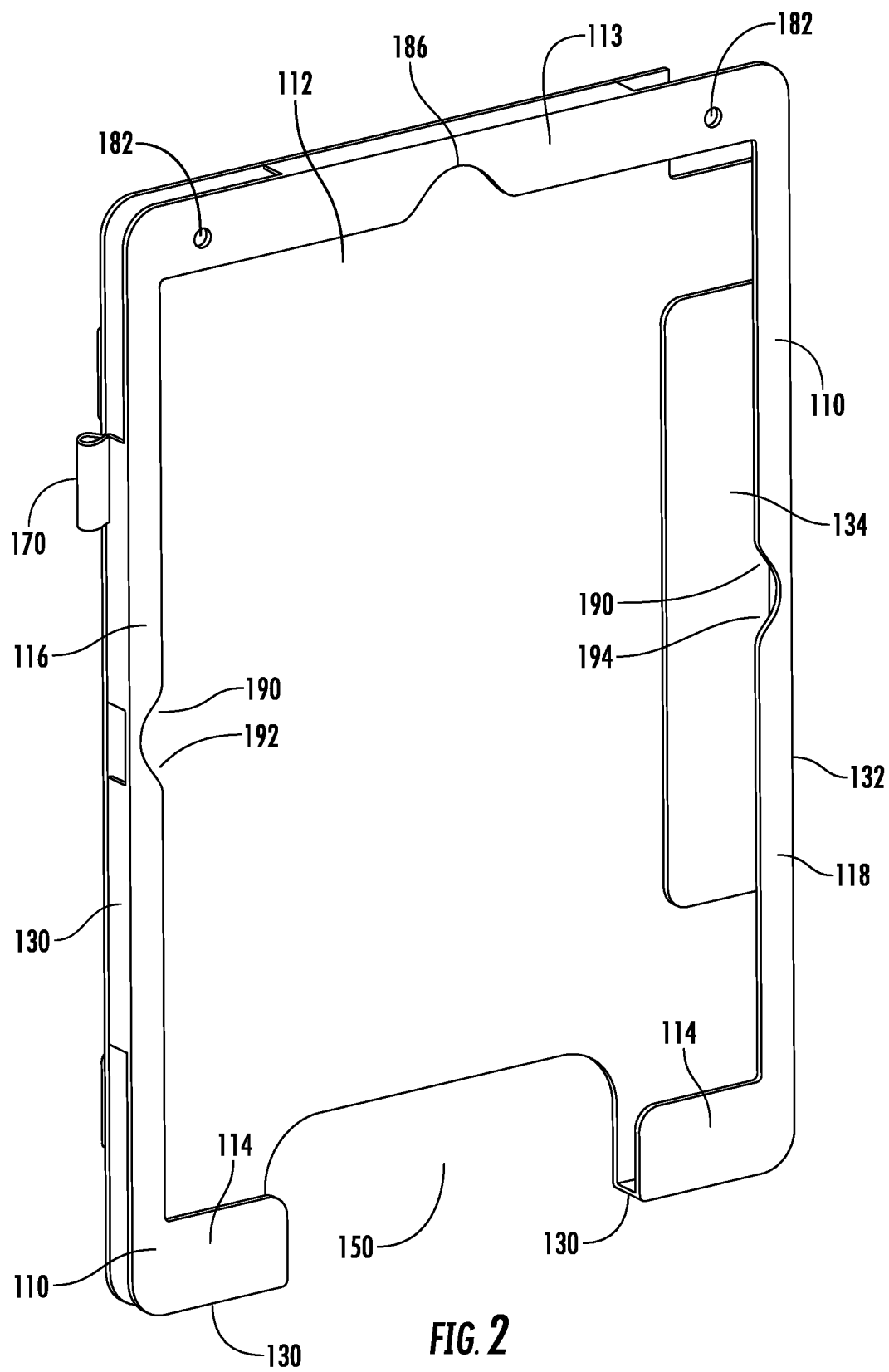
FIG. 2 is a perspective view of an enclosure for an electronic device equipped with an accessory, in accordance with embodiments of the invention.

FIG. 1 illustrates a front view of an electronic device 10 with an accessory 20, in accordance with embodiments of the invention. As illustrated in FIG. 1, in some embodiments the accessory 20 may be a card reader 30 that is operatively coupled to the electronic device 10. In some embodiments, the electronic device 10 may have one or more ports (not illustrated), such as but not limited to a lightning, thunderbolt, USB port (type A, type B, type C, 2.0, 3.0, 3.1, micro, mini ports, or the like ports), audio jack port, Ethernet port, display port, or any other like port that is utilized to receive an accessory 20, such as a card reader 30. The card reader 30 may include any type of card reader 30, such as but not limited to a magnetic strip card reader, a chip card reader, near-field communication reader, or any other type of card reader 30. The accessory 20 may comprise an accessory connector (not illustrated), which is configured to communicate with the port of the electronic device 10. In other embodiments, the electronic device 10 may have the connector and the accessory 20 may have the port. In some embodiments, the card reader 30 (or another accessory 20) may have one or more engaging portions 32 configured to be operatively coupled with surfaces of the electronic device 20. The engaging portions 32 may be any shape (e.g., rectangular, square, triangular, polygonal, have a circular, oval, or other radii, or other shape). The one or more engaging portions 32 may comprise one or more front face engaging portions 34, one or more rear face engaging portions (not illustrated), and/or one or more edge engaging portions 38 that are configured to operatively couple with surfaces (e.g., front surface, rear surface, and/or edge surface) of the electronic device 10. In some embodiments of the invention the card reader 30 engaging portions 32 (or other accessory engaging portions) may be or have a channel, such as a generally u-shaped, v-shaped, or other shaped channel, which is configured to communicate with the front surface, rear surface, and/or at least one edge of the electronic device 10. It should be understood that an engaging portion 32 may include two or more engaging portions 32, such as two or more channels, which may be operatively coupled together, and which may be operatively coupled to different surfaces of the electronic device 10. Regardless of the shape of the accessory 20, such as the card reader 30, it may extend around surfaces of the electronic device 10 in order to help secure (e.g., stabilize, reduce strain at the connection port, or the like) the accessory 20 to the electronic device 10.

FIGS. 2-8 illustrate embodiments of enclosures 100 for an electronic device 10 equipped with an accessory 20, such as a card reader 30. The enclosures 100 may comprise a front face 110, a rear face 120, and one or more edges 130 (e.g., top edge, bottom edge, left edge, and right edge) operatively coupling the front face 110 to the rear face 120. The front face 110 comprises a display aperture 112 which is defined by front face portions. The front face portions may include one or more of top face portions 113, bottom face portions 114, left face portions 116, and/or right face portions 118, which creates at least a partial border around at least a portion of the display of the electronic device 10. In other embodiments of the invention, these portions may be described as one or more first, second, third, and/or fourth face portions. The display aperture 112 allows viewing of a display 12 of an electronic device 10. The enclosure 100 further comprises a connection port aperture 150, located at least in one or more of the front face 110, the rear face 120, and/or one or more edges 130. The connection port aperture 150, in some embodiments, may extend from the front face 110, to at least one edge 130, and to the rear face 120 of the enclosure 100.

In some embodiments, the connection port aperture 150 is sized to extend around the accessory 20, such as a card reader 30 operatively coupled to the electronic device 10. As such, the connection port aperture 150 may be sized such that the enclosure 100 does not contact the card reader 30, including the one or more engaging portions 32, such as the front face portion 34, the rear face portion (not illustrated), and/or the edge portion 38 of the card reader 30 previously described herein. In this way, the enclosure 100 will not interfere with the accessory 20 (e.g., the card reader 30).

It should be understood that other enclosures interfere with accessories 20, such as the card reader 30, which prevents the accessories 20 from properly communicating with the electronic device 10. The other enclosures that interfere with the accessories (e.g., a card reader 30) may prevent proper communication with the electronic device 10. For example, other enclosures may inhibit full engagement of the connector of the card reader 30 with the connector port of the electronic device 10 because of interference of a portion of the other enclosures with engaging portions 32 of a card reader 30 (or other accessory 20 and/or portions thereof). As such, in some cases the other enclosures (e.g., on the front face, rear face, and/or edges of the enclosures) are contacting surfaces of the electronic device 10, which may prevent at least a portion of the engaging portions 32 of a card reader (or another accessory 20) from contacting the surfaces of the electronic device 10. This interference of the other enclosures may prevent proper communication between the accessory 20 and the electronic device, such that a portion of a connector (e.g., communicating with a corresponding port) may fail (e.g., break off in the port, bend, be prevented from full engagement, or the like). Alternatively, or additionally, one or more of the engaging portions 32 may fail (e.g., break off, bend, or the like caused by the interference of the other enclosures). The failure of the connector and/or a portion of the engaging portions 32 may occur during a forced assembly of the accessory 20 with an interfering enclosure (e.g., user forcing an accessory 20 into position over an enclosure), during operation of the accessory (e.g., as cards are being used with the card reader 30, such as sliding, inserting, or the like that causes strain and/or vibrations in the accessories or parts thereof), or by dropping the electronic device 10 and/or the accessory 20 disengaging from the electronic device 10 during operation (e.g., from the increase in the instability of the card reader 30 due to the interference).

In order to prevent or reduce interference with an accessory 20, in some embodiments of the invention, the connection port aperture 150 of the enclosures 100 described herein may have a width that ranges from 0.5 inches to 8 inches, and more particularly from 3 to 4 inches. However, it should be understood that the connection port aperture 150 may have a width of 1, 1.5, 2, 2.5, 3, 3.5, 4, 4.5, 5, 5.5, 6, 6.5, 7, 7.5, 8, or the like inches. It should be understood that the width may range within any of these widths, overlap any of these widths, or be located outside any of these widths. It should be further understood that in some embodiments the width of the connection port aperture 150 may be equal to 0.5 times the enclosure width, or equal to 0.1, 0.2, 0.3, 0.4, 0.5, 0.6, 0.7, 0.8, 0.9, or the like times the enclosure width. It should be understood that the width may range within these widths, overlap these widths, or be outside these widths. As such, the connection port aperture 150 may be sized such that it does not interfere with accessories 20, and in particular card readers 30. In some embodiments the card readers 30 may be the MagTek iDynamo, other MagTek readers, readers from other organizations, or any type of reader. As illustrated and described herein, the connection port aperture 150 is configured for alignment with an electronic connection port of the electronic device 10 and/or the associated accessory 20.

It should be further understood that the connector port aperture 150 may extend into at least a portion of the front face 110 and at least a portion of the rear face 120 of the enclosure 100. As such, it should be understood that the connection port aperture 150 may have a height of approximately 1.1875 inches, or a height that ranges from 0.5 inches to 2 inches. In some embodiments, the height may be 0.5, 0.6, 0.7, 0.8, 0.9, 1.0, 1.1, 1.2, 1.3, 1.4, 1.5, 1.6, 1.7, 1.8, 1.9, 2.0 inches, or the like. It should be understood that the height may range within these heights, overlap these heights, or be located outside these heights. It should be further understood that in some embodiments the height of the connection port aperture 150 may be equal to 0.125 times the enclosure height, or equal to 0.02, 0.04, 0.06, 0.08, 0.1, 0.12, 0.14, 0.16, 0.18, 0.2, 0.22, 0.24, 0.26 or the like times the enclosure height. It should be understood that the height may range within these heights, overlap these heights, or be outside these heights. In some embodiments, it should be understood that the connector port aperture 150 may have a height such that it communicates with (e.g., extends into) the display aperture 112 (e.g., has a height that is greater than the border of the front face 112, such as the bottom front face portion). The connector port aperture 150 may also have a thickness that is the same as at least one of the edges 130 (e.g., bottom edge, or other like edge that has a connector port to which the accessory 20 is operatively coupled) of the enclosure 100. The thickness (or depth) may be any dimension, depending on the thickness of the electronic device 10 and/or the enclosures (e.g., thickness of the combination of the front face of the enclosure, electronic device, and the rear face of the enclosure). The connection port aperture 150 may be sized (e.g., width, height, and thickness) such that it does not interfere with the accessories 20 (e.g., engaging portions 32), and in particular a card reader 30. As previously described, the engaging portions 32 may be any size and shape, and thus it should also be understood that the corresponding connector port aperture 150 may be any size and/or shape (e.g., rectangular, square, triangular, polygonal, have a circular, oval, or other radii, or other shape) to prevent interference with the engaging portions 32 of the card reader 30 (or any type of accessory 20).

In the embodiments where the enclosure 100, and in particular the connector port aperture 150, is sized for use with the iDynamo product from MagTek, the connector port aperture 150 may be slightly larger (e.g., dimensions may be 0.05, 0.1, 0.2, or the like inches larger) than the iDynamo product and/or the associated adapter described below. It should be understood that the connector port aperture 150 may be sized to allow for the assembly and disassembly of the iDynamo product when the electronic device 10 is assembled with the enclosure 100. In some embodiments the card readers 30, and in particular the iDynamo product, may be approximately 2.47 inches wide, 1.50 inches high, and 0.58 inches thick. Moreover, it should be understood that the engaging portions 32 described herein may be operatively coupled to the card reader 30 (e.g., integrally, a portion that is removable, and/or the entire engaging portion 32 is removable). In some embodiments, the engaging portions 32 may be, or may be included in, one or more adapters. With respect to the iDynamo product, it may be utilized with one or more adapters that are sized for any type of electronic device 10 (e.g., any iPad version, iPhone version, or other like mobile device). It should be understood that in some embodiments the adapter may have a width of 3.75 inches. In other embodiments the adapter may have a height of 1.08 inches. In still other embodiments the adapter may have a thickness of 0.58, 0.6, 0.62, 0.7, and/or other like inches. All of the dimensions recited herein are external dimensions of the features of the iDynamo and its adapters and there may be other features with different dimensions. Moreover, other adapters for the iDynamo product or other card readers 30 may have adapters that are sized the same or differently, and in response the connector port aperture 150 discussed herein may be sized such that it is slightly larger than any sized adapter and/or card reader 30. In some embodiments of the invention, it should be understood that the enclosure 100 may further comprise an accessory securement element (not illustrated) that is utilized to secure at least a portion of the accessory. For example, the accessory securement element may include a pocket, flap, strap, or the like that surrounds at least a portion of the accessory 20 (e.g., one or more engagement portions 32), such that the accessory securement element helps to reduce the chance of the accessory being disengaged from the electronic connection port of the electronic device 10. In some embodiments, the accessory 20 may be a card reader 30 and the accessory securement element may help to secure the card reader 30 to the electronic device 10. As such, in some embodiments a portion of the enclosure 100, such as a card reader securement element (not illustrated), may be utilized to surround a portion of the card reader 30 (e.g., one or more engaging portions 32) as the card reader 30 is being installed and/or after the card reader 30 is installed.

In one embodiment the securement element may be a pocket formed in a portion of the enclosure 100. The pocket may be offset from the electronic device 10 (e.g., when installed) adjacent the connector port to allow for receipt of a portion of the accessory 20. The pocket may be formed in the front face 110 (e.g., near the bottom portion of the front face), in the rear face 120 (e.g., the bottom portion of the rear face), and/or in an edge 130 adjacent the connector port (e.g. left or right of the connector port). As such, the pocket may cover a portion of the electronic device 10, but may be offset from the electronic device 10 such that a space is created between the enclosure 100 and the electronic device 10 (e.g., a portion of the edge, front face, or rear face of the enclosure is offset from the electronic device 10). A portion of the accessory 20 may be inserted into the pocket during assembly, and the pocket may surround the portion of the accessory (e.g., one or more engaging portions 32, or the like). Alternatively, the accessory 20 may be operatively coupled to the electronic device 10 and during assembly of the enclosure 100 and the electronic device 10 the pocket may cover a portion of the accessory 20 (e.g., the one or more engagement portions 32, or the like).

In other embodiments of the invention, a strap or flap is used after assembly of the accessory 20, such as the card reader 30, to the electronic device 10 in order to help to secure the accessory 20 to the electronic device 10. That is, a strap or flap may be folded over, wrapped around, threaded through, or the like with respect to at least a portion of the accessory 20 (e.g., the card reader 30, such as the engaging portions 32) and operatively coupled to the enclosure 100 in order to provide additional security to the accessory 20 (e.g., card reader 30, to prevent or reduce strain, vibrations, or the like on the card reader 30).

It should be understood that in some embodiments, the accessory 20 may be operatively coupled to the electronic device 10 before or after the electronic device 10 is operatively coupled (e.g., assembled) to the enclosure 100. For example, in some embodiments at least a portion of the front face, rear face, and/or one or more edges may be removeably operatively coupled to each other. As such, regardless of whether or not the electronic device 10 is assembled within the enclosure 100, a portion of the front face (e.g., bottom portion of the front face, border, or the like), the rear face (e.g., bottom portion of the rear face adjacent the accessory connector port), and/or one or more edge portions (e.g., bottom edge adjacent the accessory connector port) is removeable (e.g., Velcro, snapped, zipped, or other like portion that can be removed or uncoupled from the enclosure) such that the accessory 20 may be installed and/or removed as needed without having to remove the electronic device 10 from the enclosure 100.

Figure 4:
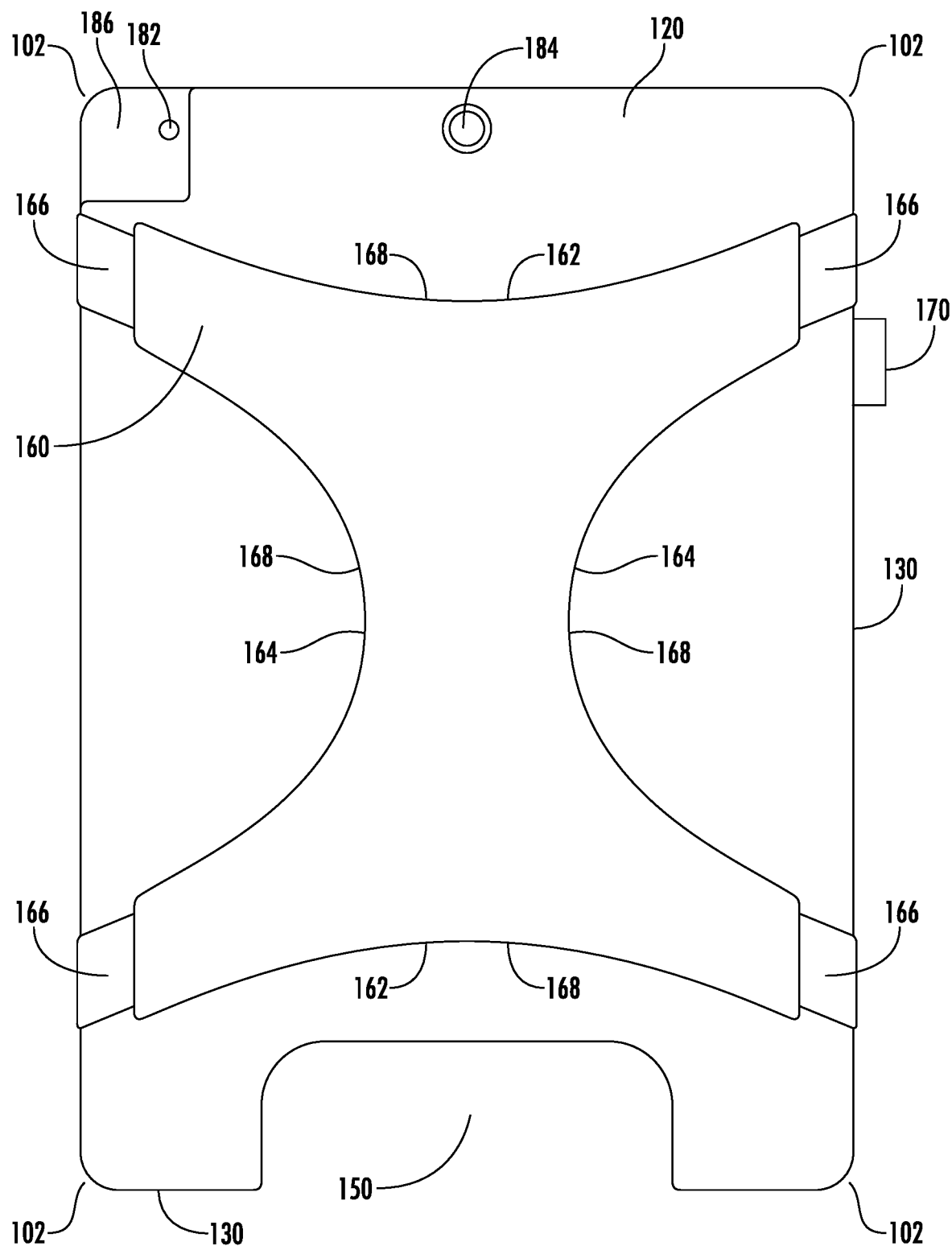
FIG. 4 is a rear face view of an enclosure for an electronic device equipped with an accessory, in accordance with embodiments of the invention.
Figure 5:
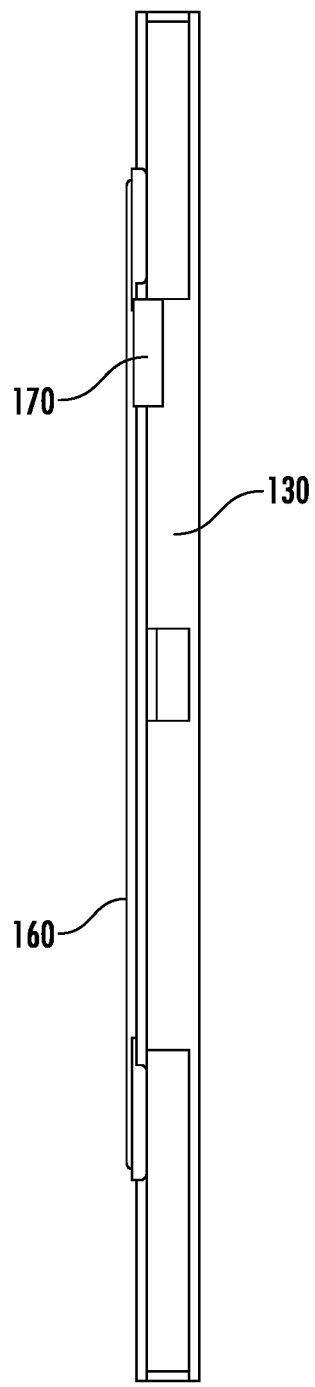
FIG. 5 is a first side edge or left side edge view of an enclosure for an electronic device equipped with an accessory, in accordance with embodiments of the invention.

In addition to the connection port aperture 150, the enclosure 100 may further include an attachment 160 (e.g., hand attachment, such as a handle, a sleeve, or the like). As illustrated in FIG. 4, the attachment is configured for holding the electronic device 10 with the enclosure 100 in at least the portrait or landscape orientations. As such, the attachment 160 (e.g., the handle) may include at least one portrait aperture 162 (e.g., adjacent the bottom of the enclosure 100, adjacent the top of the enclosure 100, or the like) and at least one landscape apertures 164 (e.g., adjacent a left side of the enclosure 100, adjacent a right side of the enclosure 100, or the like). In some embodiments of the invention, the attachment 160 may be a generally x-shaped attachment 160 with two portrait apertures 162 and two landscape apertures 164, all of which can receive a hand for allowing viewing of the electronic device 10 in the enclosure 100 in at least four different orientations. However, it should be understood that the attachment 160 may be any shape, such as, but not limited to circular, oval, square, diamond, rectangular, any polygonal, or any other type of shape.

The attachment 160 may have one or more attachment ends 166, one or more of which is operatively coupled to the enclosure 100 adjacent an enclosure corner 102. In some embodiments, there may be four attachment ends 166 each of which are operatively coupled adjacent a corner 102 of the enclosure 100. In some embodiments, one or more of the attachment edges 168 may be operatively coupled along at least of portion of the attachment edges 168 adjacent sides of the rear face 120 and/or the one or more edges 130 of the enclosure 100. For example, a top attachment edge 168 and side attachment edge 168 may be operatively coupled adjacent a top rear side and a right rear side of the rear face 120, and one attachment end 166 is operatively coupled to the enclosure 100 adjacent a corner 102 in order to provide a portrait attachment aperture 162 at the bottom of the enclosure 100 and a landscape attachment aperture 162 on the left side of the enclosure 100. In alternate embodiments, a top attachment edge 168 is operatively coupled adjacent a top rear side of the rear face 120, and two attachment ends 166 are operatively coupled to the enclosure 100 adjacent the corners 102 of the bottom rear side of the enclosure 100 in order to create one portrait attachment aperture 162 at the bottom rear side of the enclosure 100 and two landscape attachment apertures 164 at the left and right rear sides of the enclosure 100. It should be understood that at least a portion of the attachment 160, such as the attachment ends 166 and/or the attachment edges 168 may include a stretchable material that allows for flexing and/or expansion or contraction of at least a portion of the attachment 160 (e.g., elastic at each attachment end 166, a portion of the attachment 160, or the entire attachment).

In other embodiments of the invention, it should be understood that at least a portion of each of the sides of the attachment edges 168 are operatively coupled adjacent the top rear face, top rear edge, or top front face; adjacent left and right rear faces, left and right edges, or left and right font faces; and/or adjacent bottom rear face, bottom rear edge, or bottom front face in accordance with different embodiments of the invention (e.g., x-shaped attachment rotated in a different orientation from the illustrated orientation in the Figures). Moreover, in this embodiment each of the corners 102 of the enclosures 100 may have an aperture to receive a hand for holding the enclosure 100, and thus, the electronic device 10 in one or more portrait and/or landscape orientations.

It should be understood that other types of attachments (e.g., handles, or the like) may be utilized to provide viewing of the electronic device 10 in the portrait orientation, landscape orientation, or combination orientations thereof, while a user 4 holds the electronic device 10 with one hand. In some embodiments of the invention, the rear face 120 may include a projection (e.g., knob, or the like), which a user may utilize (e.g., hold, secure fingers around, or the like) in order to view the display 12 of the electronic device in different orientations.

Figure 3:
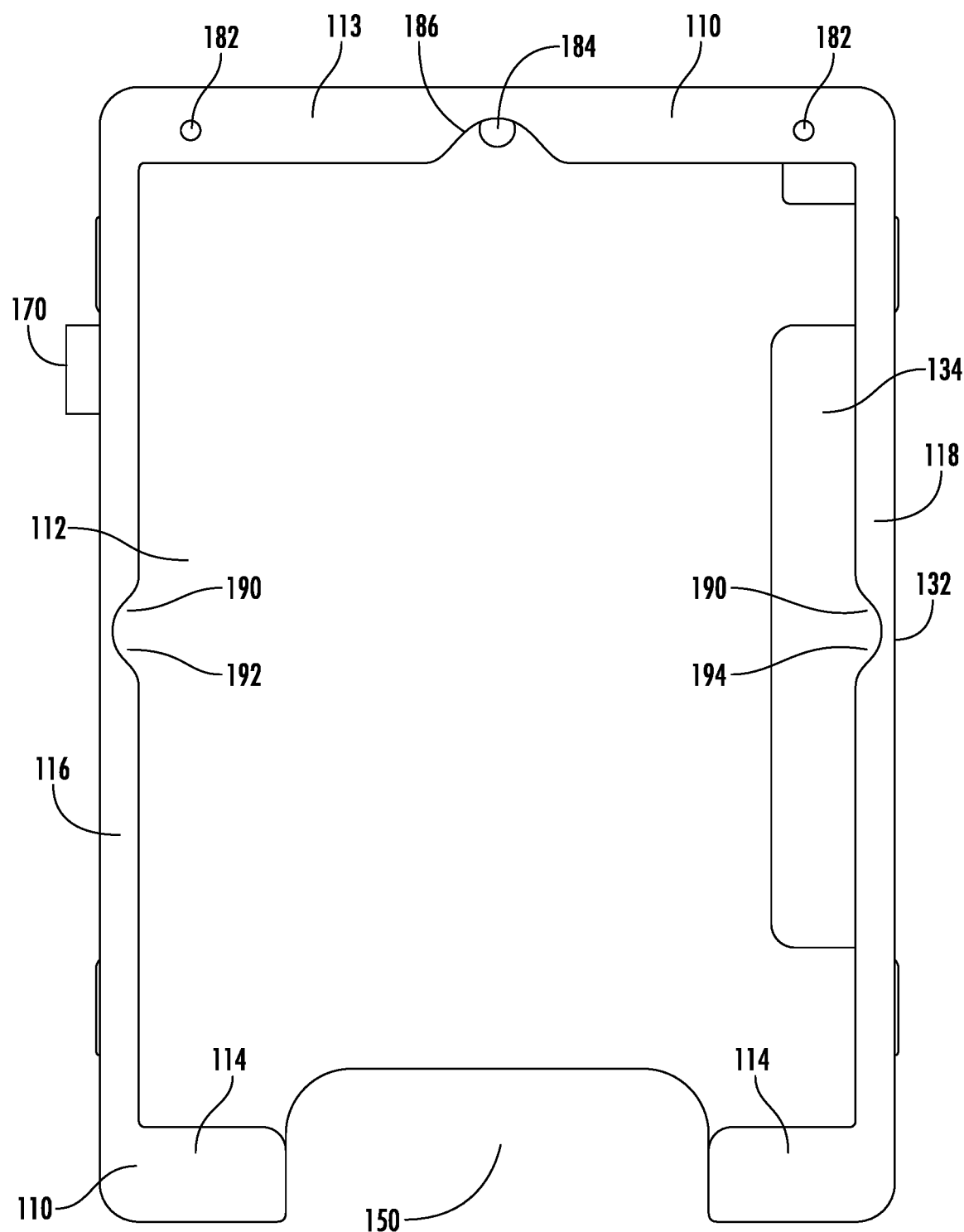
FIG. 3 is a front face view of an enclosure for an electronic device equipped with an accessory, in accordance with embodiments of the invention.
Figure 6:
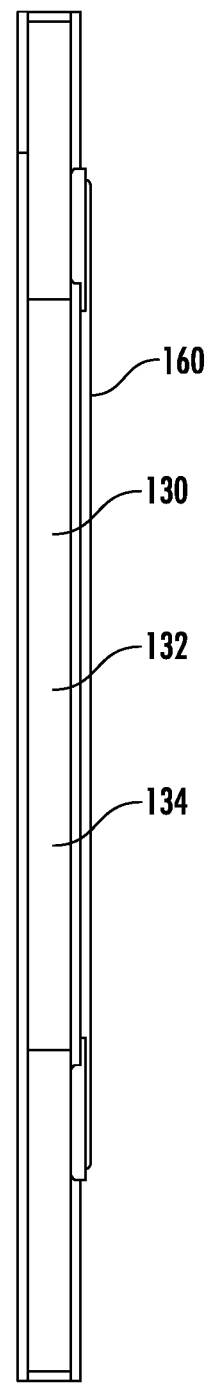
FIG. 6 is a second side edge or right side edge view of an enclosure for an electronic device equipped with an accessory, in accordance with embodiments of the invention.
Figure 7:
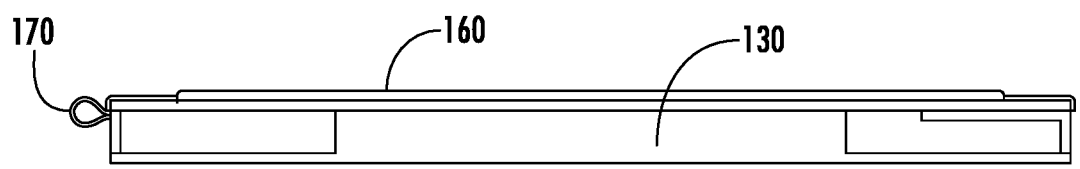
FIG. 7 is a top edge view of an enclosure for an electronic device equipped with an accessory, in accordance with embodiments of the invention.
Figure 8:
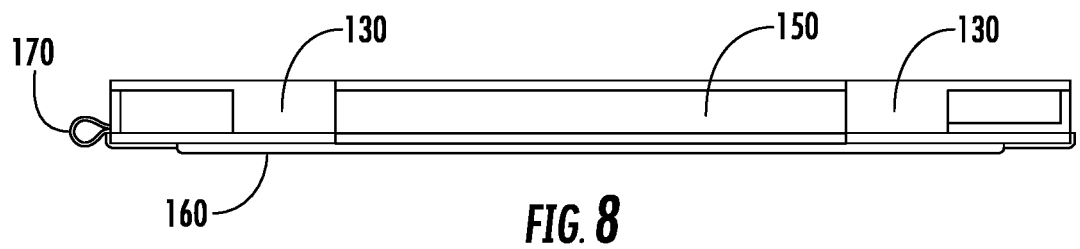
FIG. 8 is a bottom edge view of an enclosure for an electronic device equipped with an accessory, in accordance with embodiments of the invention.

As illustrated in FIG. 3 and FIG. 6 at least one edge 130 (e.g., top, bottom, left, and/or right edge) may have an assembly aperture 132 that allows for assembly and disassembly of the electronic device 10 with the enclosure 100. An assembly element 134 (e.g., flap, strap, or the like) may be operatively coupled to the front face 110, the rear face 120, and/or the edge 130 of the enclosure 100 for securing the electronic device 10 within the enclosure 100. It should be understood that in other embodiments of the invention the assembly element 134 may comprise of one or more assembly flaps that could be used to operatively couple the rear face 120 to the front face 110. In some embodiments of the invention the assembly element 134 may have a length that ranges from 3 to 9 inches, and more preferably from 5 to 7 inches. However, it should be understood that the assembly element 134 (e.g., the flap and/or combinations of the lengths of one or more assembly flaps) may be 2, 2.5, 3, 3.5, 4, 4.5, 5, 5.5, 6, 6.5, 7, 7.5, 8, 8.5, 9, 10, 12, 13, 15 inches, or other like length. It should be understood that the length of the assembly element 134 (or combination of flaps) may range within, overlap, or be outside of these lengths. The assembly element 134 may be secured to the enclosure 100 along at least the majority of the length of the assembly element 134 in order to provide additional security for aiding in preventing the electronic device 10 from being accidentally removed from the enclosure 100.

The assembly aperture 132 and/or assembly element 134 may be located in any face or edge of the enclosure 100. In one embodiment, the assembly aperture 132 and/or assembly element 134 is located in a right edge 130 of the enclosure 100. In other embodiments, the assembly aperture 132 and/or assembly element 134 may be located in the top edge 130 (e.g., opposing the bottom edge), such that an electronic device 10 with an installed accessory 20 may be slid into the assembly aperture 132 (e.g., with the accessory 20 inserted first) and the accessory may slide out of the connector port aperture 150 located in the bottom edge 134 of the enclosure 100 (e.g., with or without the accessory securement element previously described herein). In other embodiments of the invention, the assembly element 134 may be located in the front face 110 (e.g., at least one top, bottom, and/or left or right portion of the front face, such as a portion of the border). In other embodiments of the invention, the assembly element may be located in the rear face 120 (e.g., at least one top, bottom, left or right, or middle portion). The assembly element 134 may allow for assembly of the electronic device 10 within the enclosure 100 through the use of one or more of the assembly elements 134.

The enclosure 100 may further comprise a stylus support feature (e.g., stylus holder, or the like). In some embodiments of the invention, the stylus support feature 170 may be an elastic band holder, or other like holder that is operatively coupled to a portion of the front face 110, rear face 120, and/or one or more edges 130. The stylus support feature is utilized to reduce the loss of styluses that are utilized along with the electronic device 10.

Additionally, the front face 110 and/or rear face 120 may have a plurality of face apertures 180, for various features. For example, there may be one or more ambient light apertures 182 to prevent blocking the ambient light sensors, one or more hanging apertures 184 for securing the electronic device 10 by the enclosure 100 when not in use, and/or one or more camera apertures 186 (e.g., hole, cutouts, or the like) for preventing obstruction of one or more cameras, flashes, or the like of the electronic device 10.

In some embodiments of the invention, the one or more face apertures 180 may further include one or more swipe apertures 190 (e.g., front face swipe apertures). It should be understood that the one or more swipe apertures 190 may be located in the left face portion 116 and/or the right face portion 118 of the front face 110 of the enclosure 100. In some embodiments of the invention, the connector port aperture 150 and/or the one or more camera apertures may serve as one of the one or more swipe apertures 190. The one or more swipe apertures 190 allow a user to swipe up, down, left, or right depending on the orientation of the electronic device 10 (e.g., landscape vs. portrait). It should be understood that the front face portions 113, 114, 116, 118 of the front face 110 may be sized such that the front face aperture 112 is the same size as the display 12, is smaller than the display 12, and/or is larger than the display 12 of the electronic device 10. As such, the one or more swipe apertures 190 allow the display 12 and/or electronic device 10 (e.g., the touch screen features) to recognize that a user is trying to swipe up, down, left, or right from outside of the display 12 onto the display 12 in order to view features offered by the electronic device 10 or application thereof. As such, the one or more swipe apertures 190 allow for swiping that is more easily detected by the electronic device 10 when the electronic device 10 is assembled within the enclosure 100. It should be understood that in some embodiments of the invention, swiping may refer to the user dragging one or more fingers from a surface of the electronic device 10 (e.g., outside the display 12, or the like) onto the display 12 of the electronic device 10.

It should be understood that the swipe apertures 190 are illustrated as having a radius, such as in the approximate shape of an oval or circle. It should be understood that the swipe apertures 190 may be any shape, such as but not limited to generally or approximately rectangular, square, triangular, polygonal, have a circular, oval, or other radii, or any other shape. It should be understood that the one or more swipe apertures may be sized to be equal to 0.5 times the height of the top face portion 113 (or bottom face portion 114), or be 0.5 times the width of the left face portion 116 and/or right face portion 118. In other embodiments of the invention the dimensions of the one or more swipe apertures may be equal to 0.1, 0.2, 0.3, 0.4, 0.5, 0.6, 0.7, 0.8, or 0.9 times the width or height discussed above. In other embodiments of the invention, the dimensions may range between, within, overlap, and/or be outside of any of these values ("X" times the height or width). In still other embodiments, the one or more swipe apertures 190 may extend through the entire width and/or height of the portions of the front face 110 (e.g., top face portion 113, bottom face portion 114, left face portion 116, and/or right face portion 118). It should be understood that the one or more swipe apertures 190 may be any size, but in some embodiments may be sized to receive at least one finger of a user, or a portion thereof, within the one or more swipe apertures 190.

In some embodiments of the invention, the enclosure 100 may have one or more portions that are made of plastic, elastic, nylon, leather, faux leather, cotton, polyester, elastane, and/or other type of material. As such, any of the portions of the enclosure 100 may be made of any type of material.

It should be understood that all of the dimensions discussed herein (e.g., related to the enclosure 100, the connector port aperture 150, the one or more swipe apertures 190, the card reader 30 or other accessory 20, and/or any other feature thereof) may be approximate dimensions, and the actual dimension may be +/−1, 2, 3, 4, 5, 10, 15, 20, 25, 30, 35, 40, 45, 50, 60, 70, 80, or other like percent of the dimensions recited herein, or in other embodiments range between, overlap, or be outside of the forgoing.

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or they are permanently integrally coupled together.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. An enclosure for an electronic device, the enclosure comprising:
    a front face comprising a top face portion, a bottom face portion, a left face portion, and right face portion, wherein the top face portion, the bottom face portion, the left face portion, and the right face portion forms a display aperture, wherein the bottom face portion is operatively coupled to the left face portion at a corner between the bottom face portion and the left face portion, and the bottom face portion is operatively coupled to the right face portion at a corner between the bottom face portion and the right face portion, and wherein the display aperture is configured to allow viewing of a display of the electronic device, and wherein the top face portion comprises a top face swipe aperture that extends from the display aperture into the top face portion, the left face portion comprises a left face swipe aperture that extends from the display aperture into the left face portion, and the right face portion comprises a right face swipe aperture that extends from the display aperture into the right face portion;
    a rear face;
    one or more edges operatively coupling the front face to the rear face, wherein the one or more edges comprises at least a bottom edge that operatively couples the bottom face portion to the rear face; and
    a connector port aperture in the bottom face portion, the bottom edge that operatively couples the bottom face portion to the rear face, and the rear face, wherein the connector port aperture in the bottom face portion extends to the display aperture in the front face and is located between the corner between the bottom face portion and the left face portion, and the corner between the bottom face portion and the right face portion, such that the bottom face portion is discontinuous, wherein the connector port aperture extends through the bottom edge, such that the bottom edge is discontinuous, and wherein the connector port aperture is sized to extend around at least a portion of an accessory operatively coupled to the electronic device, and wherein the connector port aperture serves as a bottom face swipe aperture.

2. The enclosure of claim 1, wherein the connector port aperture is configured to prevent interference with the accessory.

3. The enclosure of claim 1, wherein the connector port aperture has a width that ranges from 0.3 times to 0.7 times the width of the enclosure.

4. The enclosure of claim 1, wherein the connector port aperture has a width that ranges from 2.5 to 4.5 inches.

5. The enclosure of claim 1, wherein the connector port aperture has a height that ranges from 0.5 to 2 inches.

6. The enclosure of claim 1, wherein the connector port aperture is configured to align with an electronic connection port of the electronic device.

7. The enclosure of claim 1, wherein the one or more edges, the front face, or the rear face comprise an accessory securement element configured for securing at least a portion of the accessory when the accessory is operatively coupled to the electronic device and the electronic device is secured within the enclosure.

8. The enclosure of claim 7, wherein the accessory securement element comprises a pocket that creates an accessory space configured to receive at least the portion of the accessory, a strap that surrounds at least the portion of the accessory, or a flap that surrounds at least the portion of the accessory.

9. The enclosure of claim 1, further comprising:
    an attachment operatively coupled to the rear face, the one or more edges, or the front face.

10. The enclosure of claim 9, wherein the attachment is open in at least two orientations, wherein a first orientation is a landscape orientation and wherein a second orientation is a portrait orientation.

11. The enclosure of claim 9, wherein the attachment is operatively coupled adjacent each corner of the enclosure, wherein the attachment has openings in at least a top side, a bottom side, a left side, and a right side between the attachment and the rear face, and wherein each of the openings may receive a hand.

12. The enclosure of claim 9, wherein the attachment has openings in at least each corner of the enclosure, and wherein each of the openings may receive a hand.

13. The enclosure of claim 1, further comprising:
    an assembly aperture in at least one edge of the one or more edges located between the front face and the rear face; and
    an assembly element operatively coupling the front face to the rear face at the assembly aperture, wherein the assembly aperture and the assembly element allow for securing the electronic device within and removing the electronic device from the enclosure.

14. The enclosure of claim 13, wherein the assembly element comprises a flap that operatively couples a portion of the front face to a portion of the rear face.

15. The enclosure of claim 1, wherein the front face comprises one or more swipe apertures, wherein the one or more swipe apertures are located at least partially within one or more of the top face portion, the bottom face portion, the left face portion, or the right face portion, and wherein the one or more swipe apertures allow a user to drag a finger from outside of the display of the electronic device into the display.

16. An enclosure for an electronic device, the enclosure comprising:
a front face comprising:
a top face portion with a top face swipe aperture;
a bottom face portion with a bottom face swipe aperture;
a left face portion with a left face swipe aperture; and
a right face portion with a right face swipe aperture;
wherein the top face portion, the bottom face portion, the left face portion, and the right face portion form a display aperture, wherein the top face swipe aperture extends from the display aperture into the top face portion, wherein the bottom face swipe aperture extends from the display aperture into the bottom face portion, wherein the left face swipe aperture extends from the display aperture into the left face portion and the right face swipe aperture extends from the display aperture into the right face portion;
wherein the bottom face portion is operatively coupled to the left face portion and the right face portion, wherein the top face portion is operatively coupled to the left face portion and the right face portion, and wherein the display aperture is configured to allow viewing of a display of the electronic device;
a rear face; and
one or more edges operatively coupling the front face to the rear face.

17. An enclosure for an electronic device, the enclosure comprising:
a front face comprising a display aperture, wherein the display aperture is configured to allow viewing of a display of the electronic device;
a rear face;
one or more edges operatively coupling the front face to the rear face; and
an attachment operatively coupled to the rear face, the one or more edges, or the front face;
wherein the enclosure comprises four corners formed from the font face, the rear face, and the one or more edges; and
wherein the attachment is operatively coupled adjacent each of the four corners of the enclosure, wherein the attachment has openings in a top side, a bottom side, a left side, and a right side, wherein each of the openings are formed between adjacent corners of the four corners between the attachment and the rear face, and wherein each of the openings may receive a hand between the attachment and the rear face.

18. The enclosure of claim 16, wherein the left face swipe aperture and the right face swipe aperture are half-circles.

* * * * *